(12) United States Patent  
Prasad

(10) Patent No.: US 8,387,083 B1
(45) Date of Patent: Feb. 26, 2013

(54) MONITORING MEDIA CONTENT CHANNELS

(75) Inventor: Rithesh R. Prasad, Coimbatore (IN)

(73) Assignee: Adobe Systems Incorporated, San Jose, CA (US)

( * ) Notice: Subject to any disclaimer, the term of this patent is extended or adjusted under 35 U.S.C. 154(b) by 407 days.

(21) Appl. No.: 11/525,349

(22) Filed: Sep. 21, 2006

(51) Int. Cl.
*H04H 60/32* (2008.01)
(52) U.S. Cl. ............... 725/14; 725/9; 725/20; 725/46; 725/47; 725/105; 386/292
(58) Field of Classification Search ............... 725/38, 725/46
See application file for complete search history.

(56) References Cited

U.S. PATENT DOCUMENTS

| | | | | |
|---|---|---|---|---|
| 6,704,931 B1 * | 3/2004 | Schaffer et al. | ............... | 725/46 |
| 6,952,576 B2 * | 10/2005 | Fish et al. | ............... | 455/414.1 |
| 7,080,392 B1 * | 7/2006 | Geshwind | ............... | 725/34 |
| 7,526,506 B2 * | 4/2009 | Cho et al. | ............... | 707/104.1 |
| 2001/0051037 A1 * | 12/2001 | Safadi et al. | ............... | 386/83 |
| 2002/0002483 A1 * | 1/2002 | Siegel et al. | ............... | 705/10 |
| 2003/0061206 A1 * | 3/2003 | Qian | ............... | 707/3 |
| 2003/0167174 A1 * | 9/2003 | Dagtas et al. | ............... | 704/275 |
| 2004/0237120 A1 * | 11/2004 | Lewin et al. | ............... | 725/135 |
| 2006/0026636 A1 * | 2/2006 | Stark et al. | ............... | 725/37 |
| 2006/0090186 A1 * | 4/2006 | Santangelo et al. | ............... | 725/87 |
| 2007/0074258 A1 * | 3/2007 | Wood et al. | ............... | 725/105 |
| 2007/0094705 A1 * | 4/2007 | Crowley et al. | ............... | 725/136 |
| 2007/0211158 A1 * | 9/2007 | Icho | ............... | 348/333.02 |

OTHER PUBLICATIONS

Wikipedia, Radio Data System, http://en.wikipedia.org/wiki/Radio_Data_System , 2007.
Marc, P2P File Sharing: Altnet Registry is about Money, not Protection, Aug. 3, 2006, http://www.p2p-weblog.com/50226711/altnet_registry_is_about_money_not_protection.php.
Winamp, What you can do with Winamp, http://www.winamp.com/support/help/50/What_You_Can_Do_with_Winamp.htm , 2007.
Windows Media, Windows Media Player, 2004.
Apple, Mac OS X Server, QuickTime Streaming Server 5.5 , 2006.
Apple, QuickTime 7.1 User's Guide, 2006.
Kevin Lynch, Macromedia, The Flash® Platform, Delivering Effective User Experiences Across Browsers, Operating Systems, and Devices, Oct. 2005.
Creating and Managing Playlists via the Web, http://www.soundscreen.com/streaming/web_playlists.html , 2007.
Microsoft, Microsoft Windows Media—Web Server vs. Streamer Server, http://www.microsoft.com/windows/windowsmedia/compare/webservvstreamserv.aspx, 2007.

* cited by examiner

Primary Examiner — Joshua Taylor
(74) Attorney, Agent, or Firm — Kilpatrick Townsend & Stockton LLP

(57) ABSTRACT

Monitoring one or more media content channels is disclosed. Monitoring includes receiving one or more search criteria associated with desired media content, receiving channel data associated with media content being broadcast via a channel, detecting a match between at least one of the search criteria and the channel data, and providing a notification of the detected match.

26 Claims, 9 Drawing Sheets

MONITORING MEDIA CONTENT CHANNELS

BACKGROUND OF THE INVENTION

Internet radio and video have become a popular way to distribute content as an alternative to traditional over the air television and radio. Some radio stations broadcast their content both over the air and over the Internet. Broadcasting refers to making content available to one or more receivers or users, where the content is made available live or in real time. The content may be recorded and distributed live (e.g., a sports event or company meeting) or predetermined (e.g., an Internet radio station broadcasts a predetermined playlist of music files such that all listeners listen to the same music at any given point in time). Unlike audio or video on demand, in which an entire media file is available for downloading at once, broadcasting makes content available in limited portions at a time, often as it is being recorded. With Internet radio and video broadcasting, multiple listeners or viewers can click on an Internet radio or video channel and listen or view media the same stream of content at the same time.

There are multitudes of audio and video broadcast channels available on the Internet, and a user may be interested in content being broadcast by more than one channel. For example, a user may be listening to a classic rock channel, but is also interested in receiving a weather report being periodically broadcast by a news channel. Typically, a user switches back and forth between the two channels to keep checking whether the weather report has started. Alternatively, the user could watch both channels simultaneously, though this may be confusing since two audio tracks are both playing, and the user still needs to glance back and forth between the two video displays. It would be useful to have a technique for monitoring content on channels not currently being viewed or listened to. In addition to Internet broadcast channels, it would be useful to have such techniques available for other types of broadcast channels, including television and radio.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
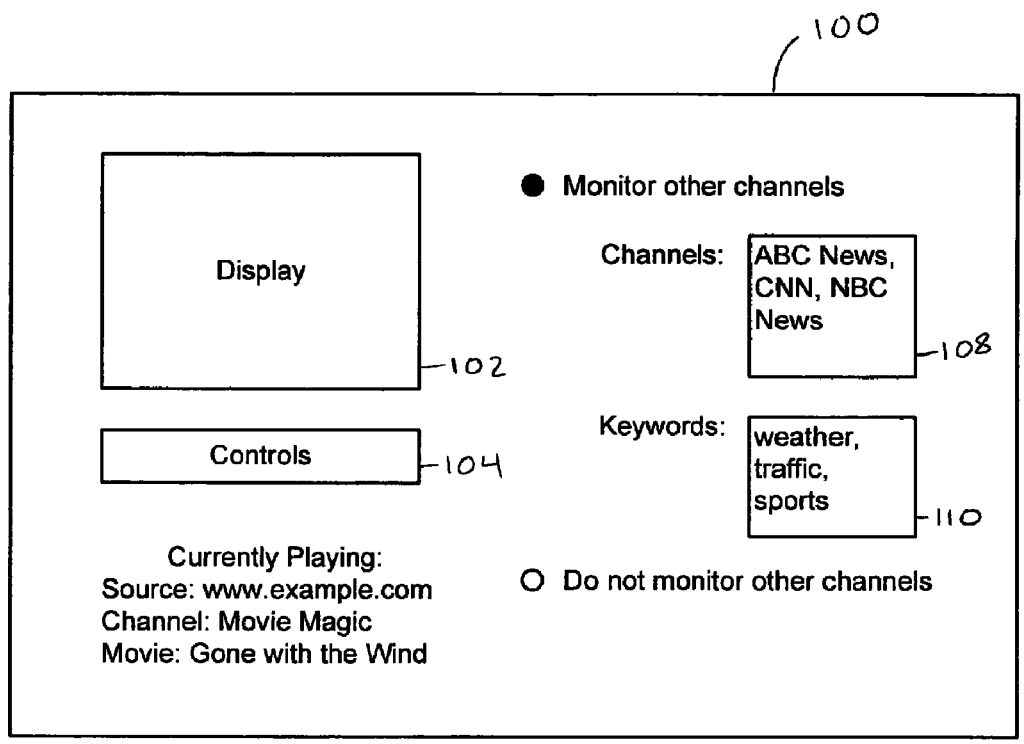
FIG. 1A is an example of an interface for a media player for playing media content.

FIG. 1A is an example of an interface for a media player for playing media content. Examples of media content include video, audio, and image content, such as movies, radio and television programs, animation, slideshows, music, etc. Media content may be stored in a variety of formats, including, for example, MPEG, MP3, WAV, AAC, and WMA file formats. In some embodiments, interface 100 is associated with a streaming media player that plays streaming media content via a streaming media server on the Internet. Examples of streaming media players include Windows Media Player, Adobe® Flash® Player, QuickTime Player, WinAmp, and iTunes. Any appropriate streaming media format may be used, such RTP or RTSP. In some embodiments, interface 100 is capable of playing content that is progressively downloaded. In other words, as the content is downloaded, it is saved locally, as opposed to streaming media in which once the content is played, it is discarded. In some embodiments, at the end of a progressive download, a full media file of the content is obtained.

In the example shown, interface 100 is shown to include display 102 for displaying video content. Controls 104 include a control interface for controlling play of the media content. For example, controls 104 may include play, pause, stop, previous, next, fast forward, rewind, and volume buttons. Information about what is currently playing is displayed below controls 104. In this example, the source of the media content is "www.example.com," i.e., the media content is stored on a streaming media server associated with URL "www.example.com." The channel is "Movie Magic." In some cases, "www.example.com" may have several channels available for playing, one of which is called "Movie Magic." Each channel may have a different theme or genre, such as movies, comedy, science fiction, etc. In this example, the movie currently being played is "Gone with the Wind." Channel data may be broadcast in a variety of ways, including multicast, simulcast, and live or simulated live.

Interface 100 also includes monitoring information (settings/controls), including options to "Monitor other channels" and "Do not monitor other channels." A user can toggle between these two options; selecting one option automatically deselects the other button. In the case where "Monitor other channels" is selected, other channels besides the currently playing channel are monitored for content associated with keywords specified by the user. For example, a user may be watching a movie, but is also interested in finding out the weather. Such a user may specify a channel associated with news and the keyword "weather." When the weather report starts playing on the specified news channel, the user is notified. The user may be notified in various ways, as more fully described below.

When "Monitor other channels" is selected, channels to monitor are specified in monitored channels input box 108 and keywords to search for are specified in input box 110. A user may edit (e.g., add or delete) the channels shown in monitored channels input box 108 and keywords input box 110. The keywords may include tags or user specified words or phrases that correspond to content to monitor for on the channels. Tags include user specified data, such as text. A variety of interfaces may be provided for editing input boxes 108 and 110, including, for example, pull down menus, free form text input boxes, etc. In some embodiments, other interfaces for monitoring other channels and specifying channels and keywords are used. For example, windows, input boxes, menus, buttons, and other objects may be used in a variety of ways. The monitoring information may be displayed and edited in a separate dialog window, for example.

Figure 1B:
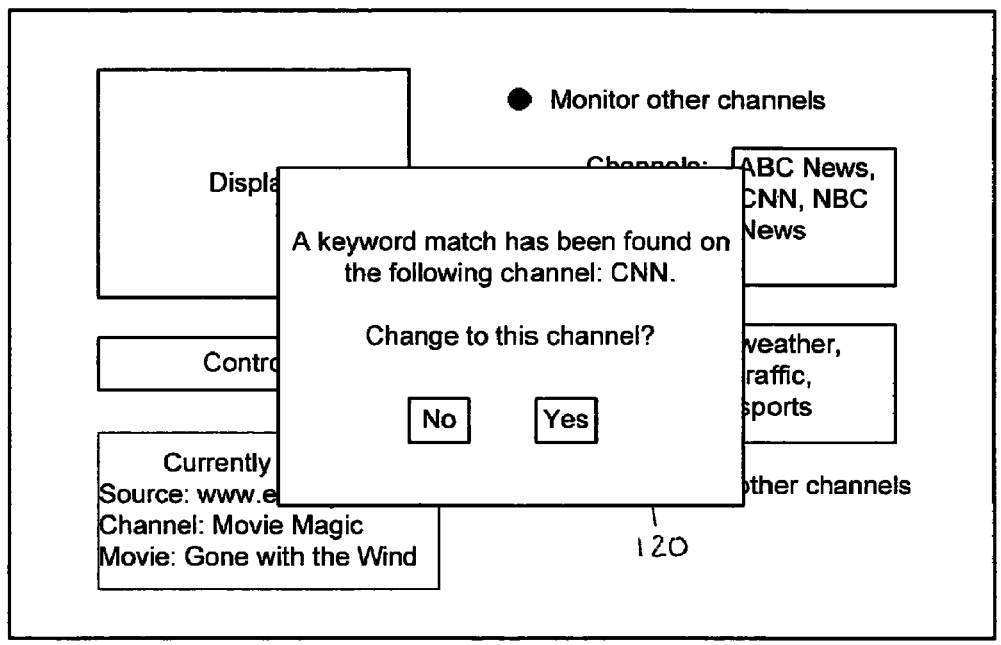
FIG. 1B is an example of an interface for a media player for playing media content when a keyword match has been detected.

FIG. 1B is an example of an interface for a media player for playing media content when a keyword match has been detected. In the example shown, a keyword match between a specified keyword and content on a specified channel has been detected. In response, notification window 120 opens and presents the user with the option to change to the channel on which the keyword match was found.

In some embodiments, if a user selects "Yes," an option to play the channel in a separate window is provided. In some embodiments, if the user selects "No," an option to remove the keyword or channel from the monitored channels and keywords is provided. In some embodiments, the channel is automatically changed to the matching channel. In some embodiments, other interfaces for notifying a user of a keyword match are used, such as by playing a sound, highlighting a channel and/or keyword, or causing a window to flash. In some embodiments, an audio notification is provided. For example, a voice saying "A keyword match has been found," may be played.

In some embodiments, an email or instant messaging (IM) message is sent as a notification. For example, a user is not currently viewing or listening to any channel and media player software is not currently open or running. The user may receive an email or IM message indicating that one or more channels is currently playing content of interest (i.e., that matches the user's keywords). The user may then open the media player software or there may be a link the email or IM message that causes the media player to open and start playing the channel.

The notification is made in real time or at least in time for the user to change channels and view the content of interest (i.e., the content that matches the user's keywords).

Some digital video recorder (DVR) systems, such as Tivo, obtain program information ahead of time, in advance of the broadcast of the program. However, in some cases there is a last minute program change and the schedule is changed. For example, if the President of the United States decides to give a speech at the last minute, the schedule may be changed, and the program information that was obtained ahead of time is incorrect. Using the techniques described herein, in some embodiments, last minute changes to scheduling are accounted for, because the channel data is sent while the media content is being broadcast. In some embodiments, the channel data is sent in real time while the media content is being broadcast. In some embodiments, the channel data and media content are broadcast over the same channel. In some embodiments, the channel data is embedded in the media content.

Figure 2:
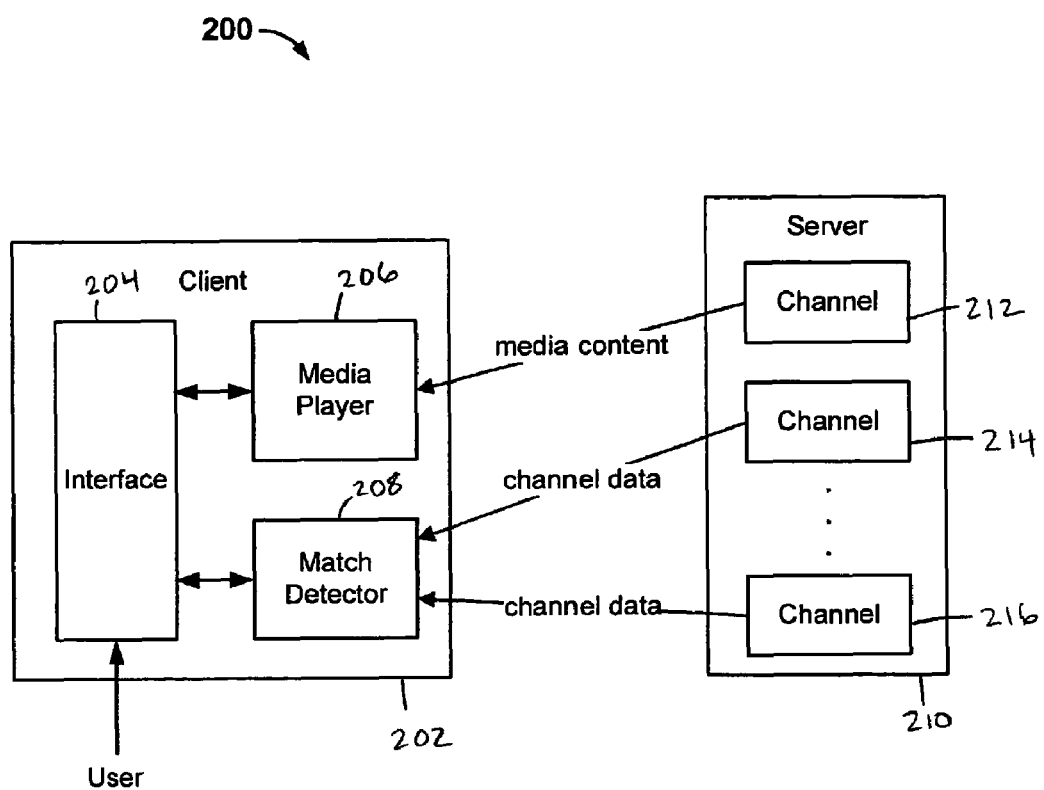
FIG. 2 is a block diagram illustrating an embodiment of a system for playing and monitoring media content.

FIG. 2 is a block diagram illustrating an embodiment of a system for playing and monitoring media content. In this example, a match between search criteria (e.g., a user specified keyword) and channel data is detected by a client, where the client is configured to receive and play media content.

In the example shown, client 202 is shown to include media player 206, match detector 208, and interface 204. A user interfaces with media player 206 and match detector 208 using interface 204. For example, the user may use interface 204 to specify a channel to monitor and search criteria. Search criteria may include keywords, tags, or any other data used to determine a match. Search criteria may also include which channels to monitor. One example of interface 204 is interface 100. Although in this example match detector 208 and interface 204 are shown separately from media player 206, in some embodiments, media player 206 includes match detector 208 and/or interface 204.

Server 210 is shown to include channels 212-216. For example, if server 210 is a streaming media server, it may provide content on multiple streaming media channels. In one example, channel 212 is a radio station broadcasting music, channel 214 is a news station broadcasting news reports, and channel 216 is a private station broadcasting a company meeting. In this example, channel 212 broadcasts audio and channels 214 and 216 broadcast video. A user may desire to listen to channel 212 while monitoring for weather on channel 214 and monitoring for sales data on channel 216. For example, the user may be a busy executive working on a key project, and may not have time to listen to the company meeting and pay attention to when the sales data is presented. In addition, the user may have a business meeting in New York the next day, and wish to monitor for weather in New York.

As shown, media content from channel 212 is transmitted to media player 206, which plays the media content. In the meantime, channel data from channels 214-216 is transmitted to match detector 208, which detects matches between the channel data and search criteria. When a match is detected, a notification is provided to the user via interface 204. In the above example in which the user is a busy executive, music content from channel 212 is played by media player 206. Channel data from the news station (channel 214) and the company meeting (channel 216) is monitored by match detector 208 for keywords "weather," "sales data," and "sales."

In some embodiments, a user can specify which channel to monitor for a certain set of keywords. For example, a keywords input box may be provided for each channel, or for each keyword, multiple channels may be specified. For example, the user may specify that only channel 214 be monitored for the keyword "weather" and that only channel 216 be monitored for the keywords "sales data" and "sales."

In some embodiments, a user may specify a strength, importance, or priority of a keyword. For example, a higher priority keyword match may cause a different notification to be displayed than a lower priority keyword match. In the above example in which the user is a busy executive, "sales data" may be designated a stronger keyword than "sales," because it is more specific to what the user is looking for, whereas the term "sales" may come up more often in a context that is not of interest to the user.

In some embodiments, media player 206 is not currently playing any content from any channel. For example, a user may be performing another task, but wish to be notified should a topic of interest come up on a channel being monitored.

Client 202 may include any device capable of receiving broadcasted media content, including a computer, desktop computer, laptop, portable device, mobile phone, radio or television set, digital video recorder, etc.

Although channels 212-216 are shown to be provided by one server, in other embodiments, channels 212-216 are provided by two or more servers. For example, channels 212 and 214 may be provided by server 210 and channel 216 may be provided by a different server.

Figure 3:
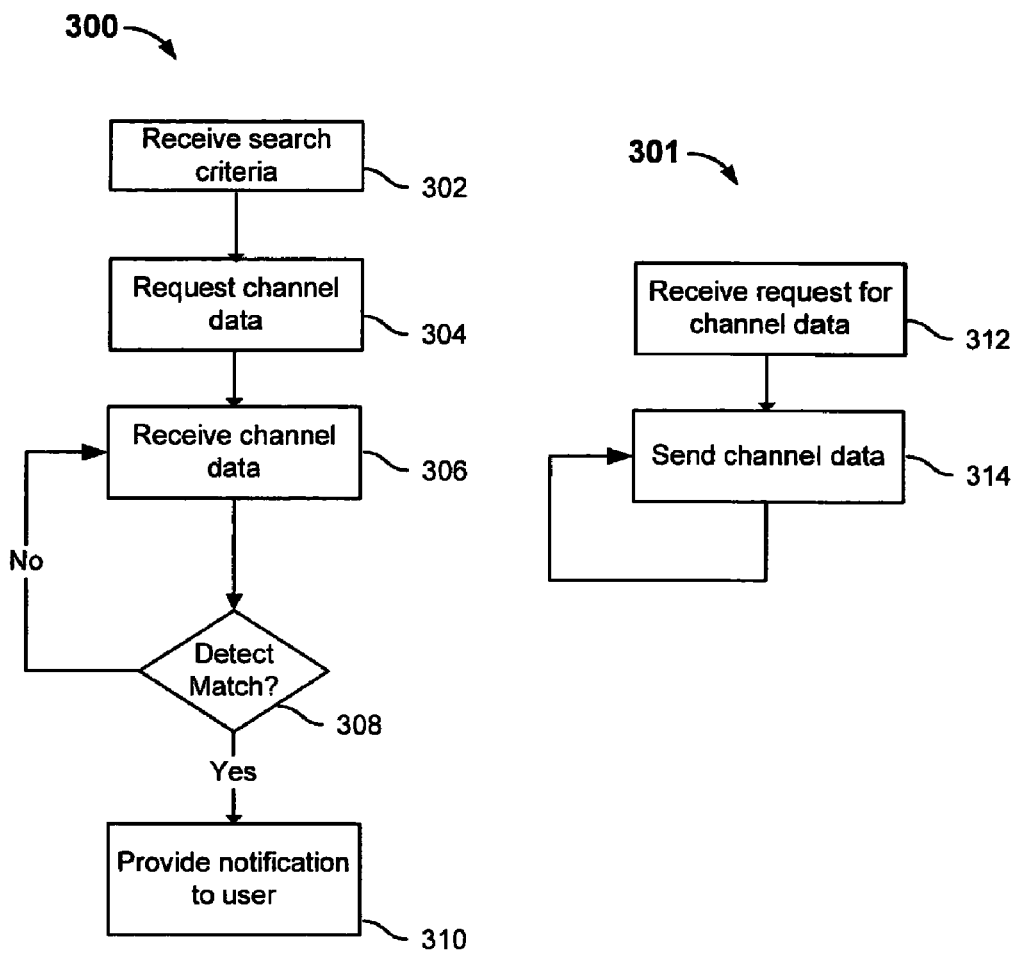
FIG. 3 is a flow chart illustrating embodiments of processes associated with monitoring media content from a media channel, where match detection is performed by a client.

FIG. 3 is a flow chart illustrating embodiments of processes associated with monitoring media content from a media channel, where match detection is performed by a client. In this example, process 300 is performed by a client, such as client 202 and process 301 is performed by a server, such as server 210. In some embodiments, process 300 is performed while displaying (playing) content from another channel.

At 302, search criteria are received. The search criteria are associated with desired content, such as topics of interest, favorite songs or artists, segments of programs, etc. Examples of search criteria include text, words (keywords), phrases, pre-defined categories, and tags associated with desired content, and channels to monitor. A user may enter search criteria in a user interface, such as interface 100.

At 304, channel data is requested. For example client 202 requests channel data from server 210 for the channels being monitored. Channel data includes channel content and/or metadata associated with the channel content. Examples of metadata include text, words (keywords), phrases, and tags. In some embodiments, metadata includes a program guide, tag, and/or embedded description. In some embodiments, only channel metadata is requested. Channel data may be formatted in various ways in various embodiments.

Figure 4:
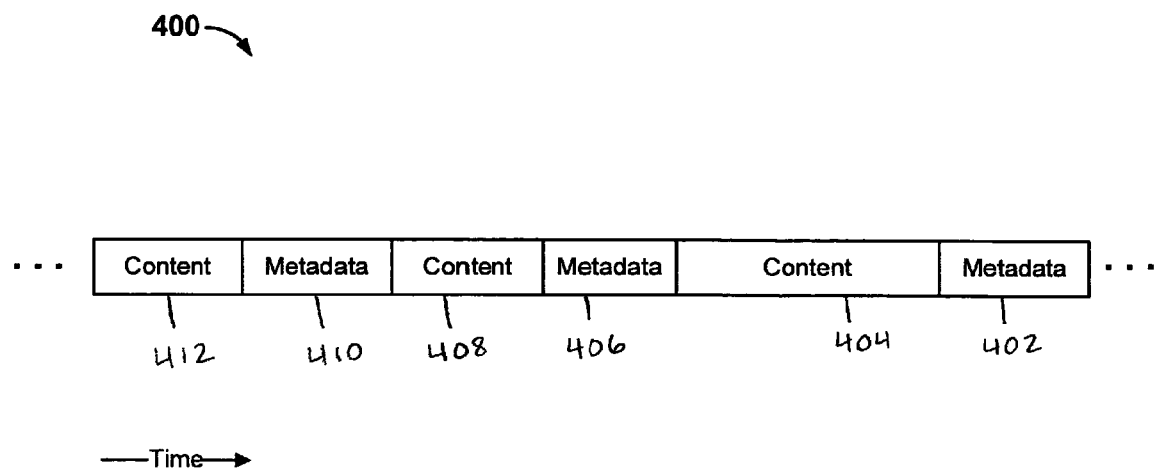
FIG. 4 illustrates an example of a channel data stream.

FIG. 4 illustrates an example of a channel data stream. In this example, channel data stream 400 shows channel data that is being transmitted. Metadata 402 is transmitted, followed by content 404, metadata 406, content 408, metadata 410, and content 412. For example, if channel data stream 400 is transmitted over a news channel, metadata 402 may include the word "headline," content 404 may include video for a headline news report, metadata 406 may include the word "national news," content 408 may include video for a national news report, metadata 410 may include the word "weather," and content 412 may include video for a weather report.

In another example, channel data stream 400 may be associated with Radio Data System (RDS), an FM broadcast standard that transmits some digital data on an FM broadcast. For example, RDS may be used to transmit a song title and artist so that RDS capable receivers can display the song title and artist while a song is being played. If channel data stream 400 is RDS data, then each of metadata 402, 406, and 410 may include a song title, artist, and other information associated with a song. Content 404, 408, and 412 each include song content corresponding to the preceding metadata.

In various embodiments, metadata is inserted in different places in the content. For example, metadata may be inserted in between scenes, programs, commercials, when a particular person or object appears, etc. Metadata may be inserted by a user, and thus may be inserted at any point at which the user chooses. For example, the user may insert "Jane" at the start of every segment during which Jane appears in a video.

Metadata may be formatted in a variety of ways. Metadata may have different lengths or fixed lengths. Metadata may be sent periodically. For example, metadata 402 may be sent every 3 seconds while content 404 is playing. This way, if metadata 402 is not received at the start of content 404 (e.g., if the channel started being monitored after the start of content 404 is broadcasted), then it can be received while content 404 is playing. In some embodiments, metadata and content are sent on separate channels. For example, a server could have a separate channel for sending metadata, where the metadata is sent at the appropriate times (e.g., at the start of scenes and programs). For example, metadata is sent on the separate channel just before the corresponding content. In some embodiments, metadata from multiple channels is sent over the separate channel, where the metadata includes an indicator of which channel a particular piece of metadata is associated with. In some embodiments, the separate channel is not a physically separate channel, but is a logically separate channel.

In some embodiments, metadata is formatted using an XML based language, such as XMP. Metadata may be formatted according to a public or a proprietary standard. In some embodiments, channel data includes MP3 formatted data, and the metadata includes ID3 metadata, such as title, artist, song, etc. In some embodiment, channel data is formatted according to a DVD format, and includes metadata at the start of each scene.

In some embodiments, the channel data does not include metadata. For example, the channel data only includes channel content. In some embodiments, metadata is derived from the channel data. For example, a video or image may be analyzed to detect objects or text depicted in the video or image. Audio data may be analyzed to detect words being spoken in video or audio data. The objects or words can be used to derive metadata for various portions of the channel data. In some embodiments, the metadata is derived from the channel content as it is being received. Examples of deriving metadata are more fully described below.

Returning to FIG. 3, at 306, channel data is received. For example, in FIG. 4, metadata 402 is received. At 308, it is determined whether a match is detected. For example, if the search criteria include the term "weather," and the metadata includes the term "weather," a match is detected. Matching may include matching the text or a portion of the text.

In some embodiments, a match of similar, related, or recommended terms also may be detected. For example, if the search criteria include the term "weather" and the metadata includes the related term "temperature," a match may be detected. If a match is detected, then a notification is provided to a user at 310. For example, a notification window such as window 120 is displayed. In some embodiments, the notification includes an option to change from a currently playing channel to the channel on which a match was found. If a match is not detected, then the process continues by receiving the next channel data at 306. For example, in FIG. 4, if metadata 402 is received and does not include matching terms, then metadata 406 is next received (in the case where only metadata is sent).

At 312, a request for channel data is received. For example, a server, such as server 210, receives the request sent at 304. Channel data is sent at 314. For example, a server is configured to send channel data or channel metadata for a channel being monitored. In some embodiments, only channel metadata is sent. In some embodiments, 304 and 312 are not performed because channel data is already being sent by a server.

In some embodiments, the above process may be performed by programming an existing media player using an appropriate programming language. For example, ActionScript may be used to program Adobe® Flash® Player to perform 302-310.

Figure 5:
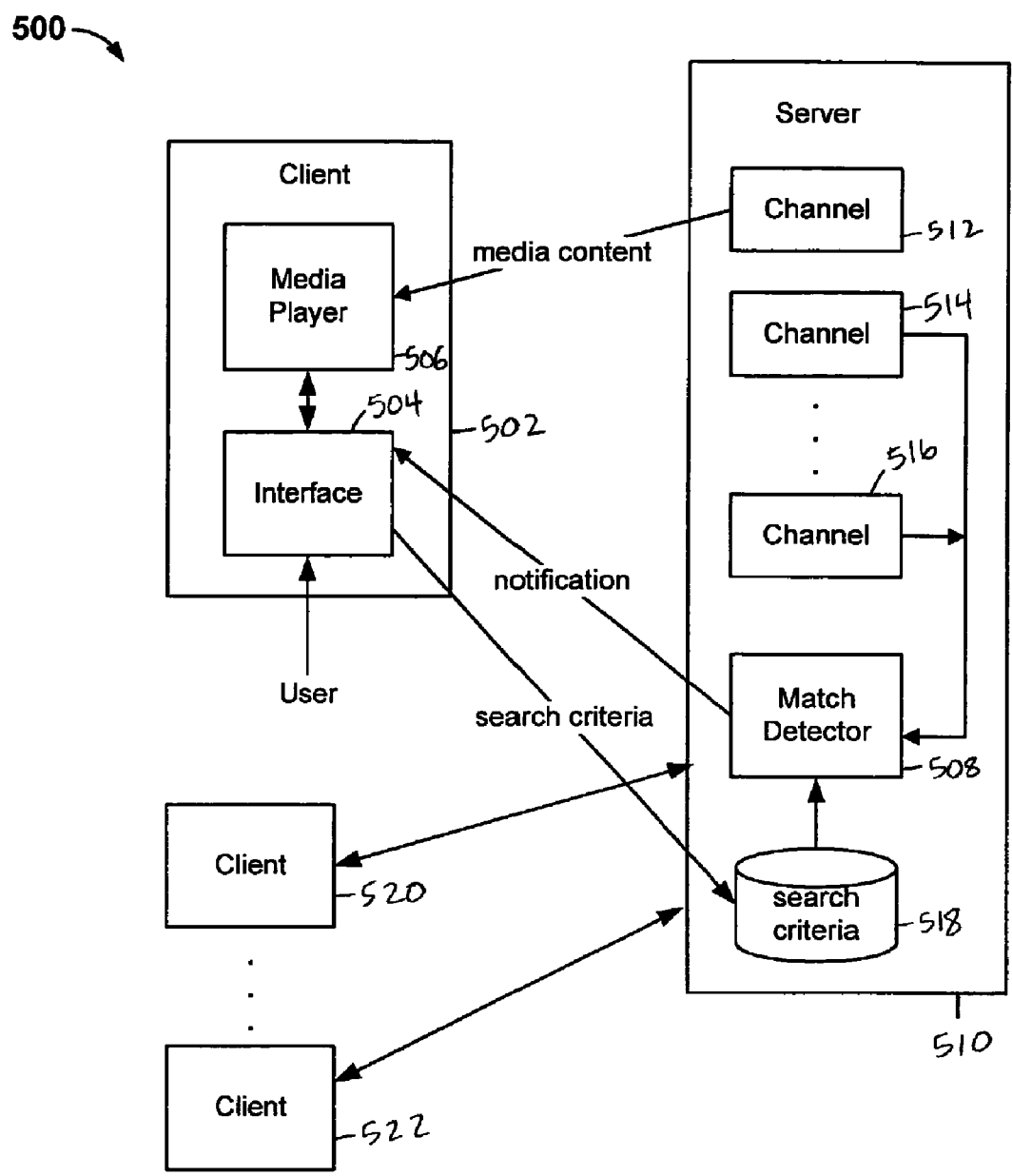
FIG. 5 is a block diagram illustrating an embodiment of a system for playing and monitoring media content.

FIG. 5 is a block diagram illustrating an embodiment of a system for playing and monitoring media content. In this example, a match between search criteria (e.g., a user specified keyword) and channel data is detected by a server, where the server is configured to transmit media content to one or more clients.

In the example shown, client 502 is shown to include media player 506 and interface 504. A user interfaces with media player 506 using interface 504. For example, the user may use interface 504 to specify a channel to watch and search criteria. Search criteria may include keywords, tags, or any other data that may be used to determine a match with channel data. Search criteria may also include channels to monitor. One example of interface 504 is interface 100. In some embodiments, clients 520 and 522 are similar to client 502; that is, each client includes a media player and interface for specifying search criteria. Different users may be using clients 502, 520, and 522. Although in this example interface 504 is shown separately from media player 506, in some embodiments, media player 506 includes interface 504.

Server 510 is shown to include channels 512-516. For example, if server 510 is a streaming media server, it may provide content on multiple streaming media channels. A user may desire to listen to channel 512 while monitoring for keywords on other channel(s). Server 510 is also shown to include match detector 508 and search criteria store 518. Search criteria are provided by a user using interface 504, sent to server 510 and stored in search criteria store 518. Other clients 520 and 522 may similarly send search criteria to server 510 so that search criteria store 518 includes search criteria for multiple clients/users. Search criteria store 518 may be formatted in a variety of ways, such as in databases, tables, lists, etc. Match detector 508 monitors channels as specified by the search criteria in search criteria store 518 for matches. When a match is detected, the appropriate client is notified.

As an example, a user of client 502 desires to watch channel 512 and receive notification when channel 514, a news channel, reports traffic. Using interface 504, the user provides as search criteria the keyword "traffic" and to monitor channel 514. The search criteria are sent to server 510 and stored in search criteria store 518. Media player 506 plays media content from channel 512. In the meantime, channel data from channel 514 is transmitted to match detector 508, which waits for a match between the term "traffic" and channel data. When a match is detected, a notification is provided to the user via interface 504. Similarly, when a match with search criteria specified by client 520 is detected, client 520 is notified.

Client 502 may include any device capable of receiving broadcasted media content, including a computer, desktop computer, laptop, portable device, mobile phone, radio or television set, etc.

Although in this example, match detector 508 and search criteria store 518 are shown as part of server 510, in some embodiments, each or both may be physically separate. Although channels 512-516 are shown to be provided by one server, in other embodiments, channels 512-516 may be provided by two or more servers. Depending on the embodiment, any number of clients may interact with a given server. Although keywords may be described in the examples herein, any search criteria may be used in various embodiments.

Figure 6:
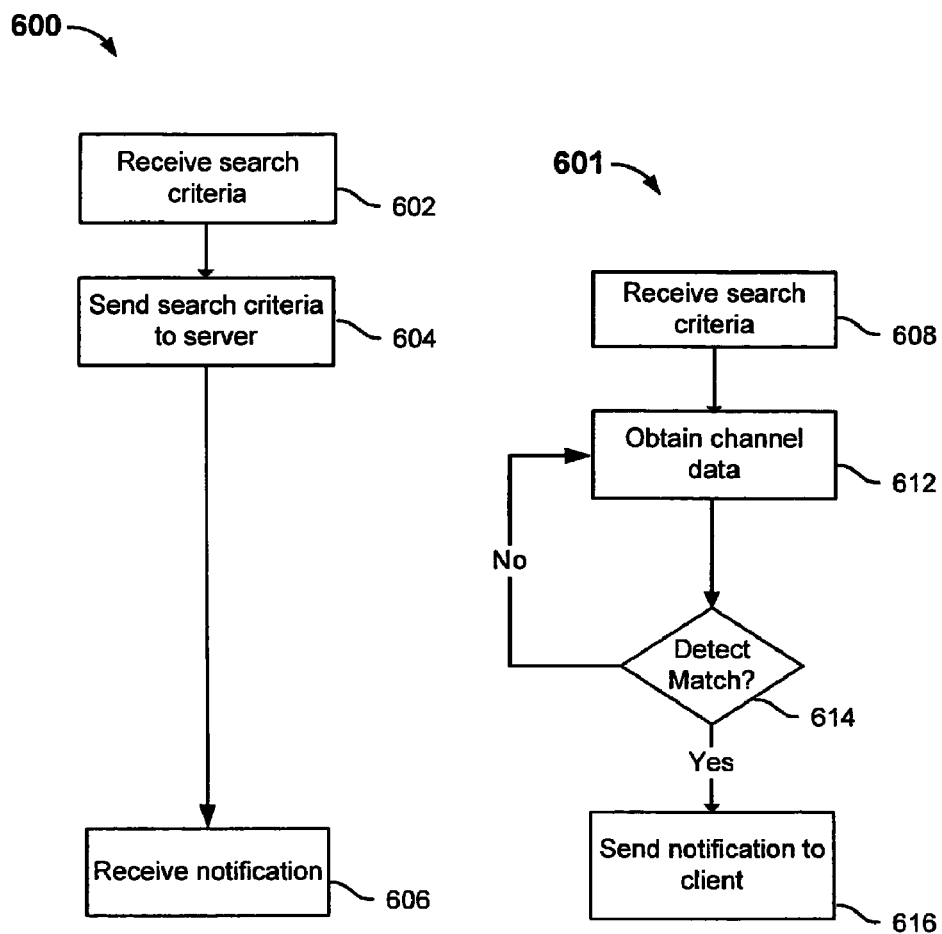
FIG. 6 is a flow chart illustrating embodiments of processes associated with monitoring media content from a media channel where match detection is performed by a server.

FIG. 6 is a flow chart illustrating embodiments of processes associated with monitoring media content from a media channel where match detection is performed by a server. In this example, process 600 is performed by a client, such as client 502, 520, or 522, and process 601 is performed by a server, such as server 510.

At 602, search criteria are received. The search criteria are associated with desired content, such as topics of interest, favorite songs or artists, segments of programs, etc. Examples of search criteria include text, words (keywords), phrases, and tags associated with desired content. Search criteria could also include which channels to monitor. A user may enter search criteria in a user interface, such as interface 100 or interface 504.

At 604, search criteria are sent to a server. For example client 502 sends search criteria to server 510. At 608, search criteria are received. For example, search criteria are received by server 510. At 612, channel data is obtained. Channel data includes channel content and/or metadata associated with the channel content. In some embodiments, if channel metadata is available, then only channel metadata is obtained. Channel data may be formatted in various ways in various embodiments, as described above.

At 614, it is determined whether a match is detected. For example, if the search criteria include the term "traffic," and the metadata includes the term "traffic," a match is detected. Matching may include matching the text or a portion of the text. In some embodiments, a match of similar, related, or recommended metadata also may be detected. If a match is not detected, then the process returns to 612 and the next channel data is obtained. If a match is detected, then a notification is sent to a client at 616. For example, a notification is sent by server 510 to client 502. At 606, the notification is received. For example, a notification window such as window 120 is displayed. In some embodiments, the notification includes an option to change from a currently playing channel to the channel on which a match was found.

Although a streaming media player and streaming media server over the Internet may be described herein, the techniques described may apply to any receiver and transmitter of media content over any transmission medium, including Internet radio, Internet television (e.g., IPTV), radio (e.g., AM, FM, RDS, digital, satellite, Sirius, XM), television (e.g., cable, satellite, digital, HDTV, analog), digital video recorders, mobile phones, portable media players (e.g., iPod), etc.

Figure 7:
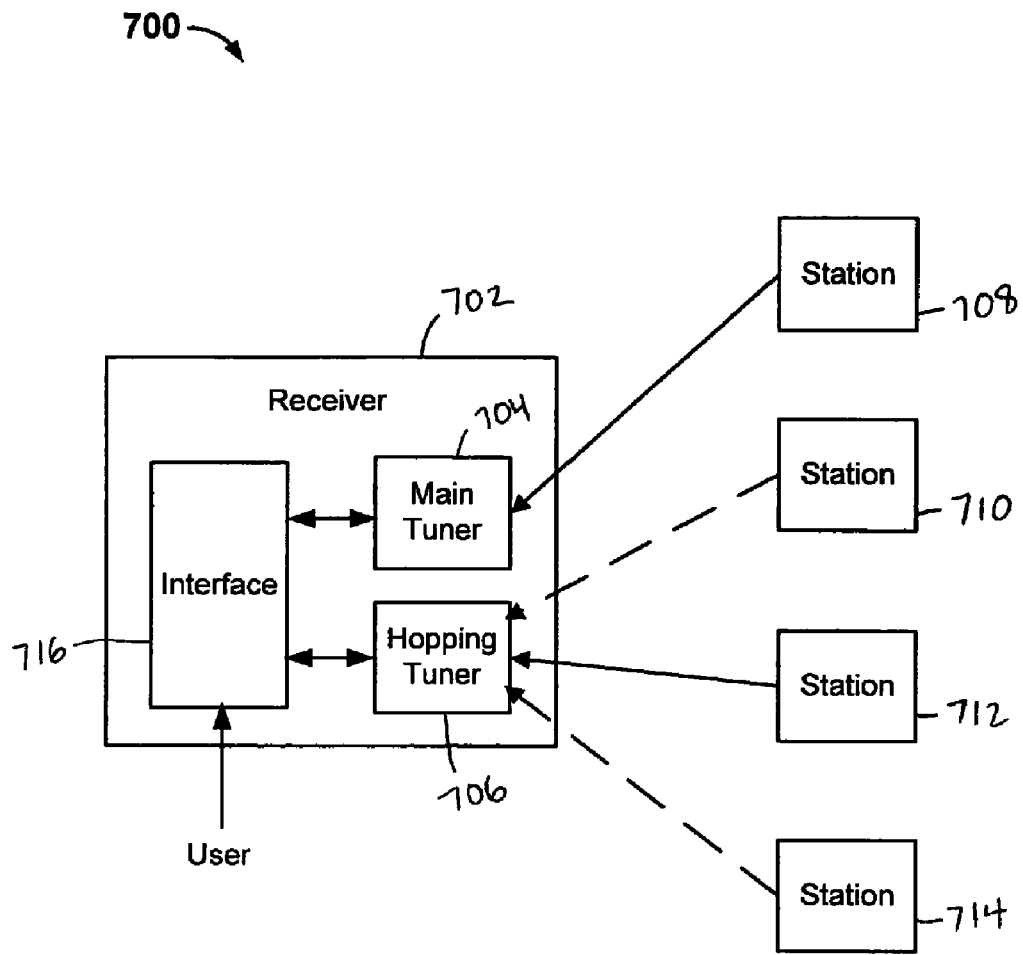
FIG. 7 is a block diagram illustrating an embodiment of a radio receiver capable of monitoring one or more channels.

FIG. 7 is a block diagram illustrating an embodiment of a radio receiver capable of monitoring one or more channels. In this example, receiver 702 is a radio receiver, for example, an FM or satellite radio receiver in a car. In some embodiments, receiver 702 is capable of receiving RDS data sent over FM radio. Receiver 702 includes two tuners—main tuner 704 and hopping tuner 706. Multiple radio stations (channels) 708-714 are broadcast and capable of being received by receiver 702. A user listens to station 708 using interface 716. In response, main tuner 704 tunes to station 708 so that content from station 708 is played by receiver 702. The user would also like to monitor other stations for traffic and weather. Using interface 716, the user enters keywords "traffic" and "weather." Hopping tuner 702 is capable of monitoring channel data from multiple channels by hopping between stations 710-714 to receive channel data, such as satellite or RDS metadata. As indicated by the dashed lines, at any one time, hopping tuner 702 is tuned to one of stations 710-714. In this example, hopping tuner 702 is currently tuned to station 712. In some embodiments, hopping tuner 702 spends a fixed amount of time tuned to each channel being monitored and receives whatever channel data is sent at that time. When a match is detected, a notification is provided. For example, interface 716 may display and/or voice the message "Traffic detected on station 710. Switch to station 710?" In some embodiments, the metadata for a given station includes the time remaining before the metadata associated with the content changes, so that hopping tuner 702 only needs to hop back to that station when that time expires to obtain the new metadata.

In some embodiments, metadata for multiple portions of content are sent in advance, including at which point different portions begin. The match detector may then identify matches prior to transmission of corresponding content data, and set a timer to notify the user at the appropriate time. For example, a schedule of content to be presented or broadcast may be sent at the start of a program, such as the following:

Time Metadata
0 Headline news
3:50 Local news
7:41 National news
13:03 Weather

As another example, a user may have a favorite song list associated with the search criteria. For example, the favorite song list may be added to by pressing a button when a favorite song is played or the favorite song list may be uploaded, e.g., via a Bluetooth or USB connection. When one of the user's favorite songs is played, a match is detected, and the user is notified. For example, a satellite radio station may digitally transmit the song title and artist before playing a song and periodically while the song is being played. In some embodiments, a match is detected when a song by the same artist, or a song of a similar genre is played. In some embodiments, the notification indicates whether an exact match or a similar match is found. For example, if an exact match of a user's favorite song is played, a first sound is played and interface 716 flashes with the text "Favorite song detected on channel x. Switch to channel x?" If a song by the same artist is played, a second sound is played and interface 716 flashes with the text "Song by artist y detected on channel x. Switch to channel x?"

In some embodiments, the user specifies which stations to monitor, so that the hopping tuner only hops between those stations. In some embodiments, the user specifies which keywords to monitor for on certain stations, so that only those keywords are searched for on those stations.

In some embodiments, hopping tuner 706 may be used to identify content that is currently playing on multiple radio stations. For example, interface 716 may display a list of stations and what is currently playing on each station based on metadata received during the time segment when hopping tuner 706 is tuned to that station. In some embodiments, the list of stations are user preset or preprogrammed stations, such as in a car radio.

In some embodiments, the user is not currently listening to any station while monitoring is being performed, so that if content of interest does start being broadcast on a monitored channel, the user is notified. For example, a user may desire to drive to work in quiet, but would like to be notified when traffic is broadcast.

The above example may be extended to any system that uses a tuner to receive a channel or station, such as television, satellite television, etc.

Figure 8:
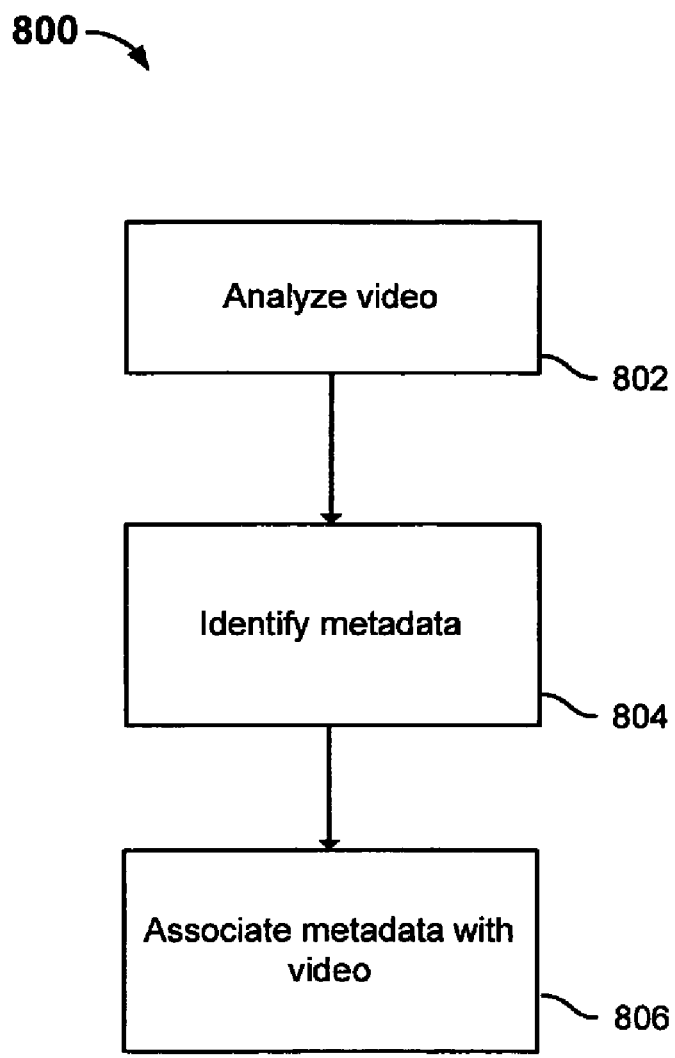
FIG. 8 is a flowchart illustrating an embodiment of a process for determining metadata for a video.

FIG. 8 is a flowchart illustrating an embodiment of a process for determining metadata for a video. In some embodiments, this process is performed manually (e.g., by a user). In some embodiments, this process is performed automatically (e.g., by a machine). In this example, metadata associated with the content of the video is determined.

In the example shown, the process begins at 802, in which a video is analyzed. For example, a user observes playback of a video or a machine analyzes video data. At 804, metadata is identified, where metadata includes any data associated with the video. Examples of metadata include text, words, phrases, or tags that describe content in the video. For example, if the video is of a birthday party, a user may identify the following scenes: "arrival of guests," "games," "blowing out candles," "eating cake," or a user may identify people or objects in the video, such as "Lisa," "Bob," "Fido," and "cake." A machine may similarly detect objects, such as faces using facial recognition, or text in the video, such as a sign that says "Happy Birthday Lisa!" A machine may also use voice recognition to detect who is speaking or speech recognition to recognize what is being said. At 806, metadata is associated with the video. In some embodiments, the metadata is inserted into the video at appropriate places in the video. For example, the metadata "eating cake" is inserted at the beginning of the cake eating scene or the metadata "Bob" is inserted whenever Bob appears. In some embodiments, the metadata is inserted periodically during the video. For example, during the cake eating scene, the metadata "eating cake" is inserted every 20 seconds or whenever Bob appears in the video, the metadata "Bob" is inserted every 10 seconds.

In some embodiments, an interface is provided for tagging various points in the video so that a user can play, fast forward, or rewind to find an appropriate scene and tag it. For example, the user may pause the video to add a tag to the paused point in the video, or add a tag while the video is playing. Although video is described in this example, metadata may be determined in a similar way for video, audio, and image content, including animation, slideshows, music, and other types of media content.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method including:
    receiving one or more search criteria associated with desired media content, the search criteria including a keyword and a user-selected subset of one or more channels to monitor that has been selected by a user from a superset of two or more channels that are available for monitoring, the superset of channels having a greater number of channels than the user-selected subset of channels;
    receiving a first program channel data for a first program comprising multiple segments of program content, associated with media content, wherein the media content is configured to be broadcast via the user-selected subset of channels, the first program channel data comprising metadata for multiple segments of content including an indication of when each segment begins, and the desired media content corresponding to one of those segments, the metadata being sent while the media content is being broadcast;
    detecting a match between the keyword and the first program channel data, wherein detecting is performed by a match detector that is configured to interface between a plurality of channel data streams and a user interface associated with a media player;
    within the matching first program channel data, identifying a segment of the first program channel data that matches the keyword and setting a timer to indicate when the matching segment of the first program channel data begins based on the metadata that indicates where multiple segments of content begin;

in the event it is determined that there is a last minute program change to a second program that affects the schedule of the matching segment of first program, accounting for the last minute second program change based on real time second program channel data being received; and in the event it is not determined that there is a last minute program change to the second program, providing a notification of the detected match when the timer indicates that the matching segment of the first program channel data is beginning while the media content is being broadcast.

2. A method as recited in claim 1, wherein the channel data is configured to be broadcast via the channel.

3. A method as recited in claim 1, wherein an interface is currently playing media content from another channel.

4. A method as recited in claim 1, wherein detecting is performed by a client configured to receive and play media content associated with the channel.

5. A method as recited in claim 1, wherein detecting is performed by a server configured to transmit media content over the channel.

6. A method as recited in claim 1, wherein the channel data includes a tag.

7. A method as recited in claim 1, wherein the channel data is embedded in the media content.

8. A method as recited in claim 1, wherein the metadata is derived from the channel data as it is being received.

9. A method as recited in claim 1, wherein the search criteria include a tag.

10. A method as recited in claim 1, wherein the match includes a match of at least a portion of text.

11. A method as recited in claim 1, wherein the media content includes streaming media content.

12. A method as recited in claim 1, wherein the notification is different based at least in part on whether the detected match between the keyword and the channel data is an exact match or a similar match and a similar match occurs when the search criteria specifies a title and the media content does not have the exact title, but has a genre associated with the title.

13. A method as recited in claim 1, wherein the notification is different based at least in part on whether the detected match between the keyword and the channel data is an exact match or a similar match and a similar match occurs when the search criteria specifies a title and the media content does not have the title, but is created by an artist associated with the title.

14. A method as recited in claim 1, wherein the notification is different based at least in part on a strength of the detected match and the strength of the detected match is based on an importance or a priority of a keyword associated with the detected match.

15. A method as recited in claim 1, wherein the notification is different based at least in part on a strength of the detected match and the strength of the detected match is based on an importance or a priority of a keyword associated with the detected match, and wherein the importance or the priority of the keyword is user specified.

16. A method as recited in claim 1, wherein detecting includes analyzing the channel data at least in part by detecting objects depicted in the channel data.

17. A method as recited in claim 1, wherein detecting includes analyzing the channel data at least in part by using voice or speech recognition techniques.

18. A method as recited in claim 1, wherein detecting includes analyzing the channel data and deriving metadata based at least in part on the analysis.

19. A method as recited in claim 1, wherein the search criteria further include a second keyword and a second user-selected subset of channels to monitor for the second keyword, the second user-selected subset of channels being different from the user-selected subset of channels.

20. A method as recited in claim 1, wherein the match is not an exact match and detecting includes detecting a match of similar, related, or recommended terms.

21. A method as recited in claim 1, wherein the channel data is received by a hopping tuner that hops between the user-selected subset of channels, spending a fixed amount of time tuned to each channel in the user-selected subset of channels, and receiving on each channel during the fixed amount of time during which the tuner is tuned to each channel, metadata for multiple portions of content, including an indication of when each portion begins.

22. A method as recited in claim 21, wherein a receiver is configured to receive the channel data and wherein the receiver includes at least two tuners, including: the hopping tuner and a main tuner that does not hop between channels and is tuned to receive channel data from one and only one channel.

23. A method as recited in claim 1, wherein the metadata for the multiple portions of content are sent in advance of the content.

24. A method as recited in claim 23, wherein the metadata for the multiple portions of content includes timing or schedule information for each portion of content.

25. A system including:

a processor; and a memory coupled with the processor, wherein the memory is configured to provide the processor with instructions which when executed cause the processor to:

receive one or more search criteria associated with desired media content, the search criteria including a keyword and a user-selected subset of one or more channels to monitor that has been selected by a user from a superset of two or more channels that are available for monitoring, the superset of channels having a greater number of channels than the user-selected subset of channels;

receive a first program channel data for a first program comprising multiple segments of program content, associated with media content, wherein the media content is configured to be broadcast via the user-selected subset of channels, the first program channel data comprising metadata for multiple segments of content including an indication of when each segment begins, and the desired media content corresponding to one of those segments, the metadata being sent while the media content is being broadcast;

detect a match between the keyword and the first program channel data, wherein detecting is performed by a match detector that is configured to interface between a plurality of channel data streams and a user interface associated with a media player;

within the matching first program channel data, identify a segment of the first program channel data that matches the keyword and setting a timer to indicate when the matching segment of the first program channel data begins based on the metadata that indicates where multiple segments of content begin;

in the event it is determined that there is a last minute program change to a second program that affects the schedule of the matching segment of first program, account for the last minute second program change based on real time second program channel data being received; and in the event it is not determined that there is a last minute program change to the second program, provide a notification of the detected match when the timer indicates that the matching segment of the first program channel data is beginning while the media content is being broadcast.

26. A computer program product embodied in a non-transitory computer readable medium and comprising computer instructions for:

receiving one or more search criteria associated with desired media content, the search criteria including a keyword and a user-selected subset of one or more channels to monitor that has been selected by a user from a superset of two or more channels that are available for monitoring, the superset of channels having a greater number of channels than the user-selected subset of channels;

receiving a first program channel data for a first program comprising multiple segments of program content, associated with media content, wherein the media content is configured to be broadcast via the user-selected subset of channels, the first program channel data comprising metadata for multiple segments of content including an indication of when each segment begins, and the desired media content corresponding to one of those segments, the metadata being sent while the media content is being broadcast;

detecting a match between the keyword and the first program channel data, wherein detecting is performed by a match detector that is configured to interface between a plurality of channel data streams and a user interface associated with a media player;

within the matching first program channel data, identifying a segment of the first program channel data that matches the keyword and setting a timer to indicate when the matching segment of the first program channel data begins based on the metadata that indicates where multiple segments of content begin;

in the event it is determined that there is a last minute program change to a second program that affects the schedule of the matching segment of first program, accounting for the last minute second program change based on real time second program channel data being received; and in the event it is not determined that there is a last minute program or schedule change to the second program, providing a notification of the detected match when the timer indicates that the matching segment of the first program channel data is beginning while the media content is being broadcast.

* * * * *

UNITED STATES PATENT AND TRADEMARK OFFICE
CERTIFICATE OF CORRECTION

| | |
|---|---|
| PATENT NO. | : 8,387,083 B1 |
| APPLICATION NO. | : 11/525349 |
| DATED | : February 26, 2013 |
| INVENTOR(S) | : Rithesh R. Prasad |

It is certified that error appears in the above-identified patent and that said Letters Patent is hereby corrected as shown below:

In the Claims

Column 14, Claim 26, Line 22:

Delete the words "or schedule"

Signed and Sealed this
Twenty-eighth Day of May, 2013

Teresa Stanek Rea
*Acting Director of the United States Patent and Trademark Office*